(12) United States Patent
Hutmacher et al.

(10) Patent No.: US 6,371,000 B1
(45) Date of Patent: Apr. 16, 2002

(54) ELECTROMAGNETIC VEHICLE DISABLER SYSTEM AND METHOD

(75) Inventors: Henry H. Hutmacher; John E. Will, both of Colorado Springs; James Youngman, Woodland Park; Phillip D. Lane; Michael V. Bell, both of Colorado Springs, all of CO (US)

(73) Assignee: Jaycor, San Diego, CA (US)

( * ) Notice: Subject to any disclaimer, the term of this patent is extended or adjusted under 35 U.S.C. 154(b) by 0 days.

(21) Appl. No.: 08/273,560

(22) Filed: Jul. 11, 1994

(51) Int. Cl.[7] .................. F41B 15/00; B60K 28/10; B60L 3/00; B60R 25/04
(52) U.S. Cl. ................ 89/1.11; 180/167; 180/279; 307/10.3
(58) Field of Search ................ 307/9.1–10.8; 361/230–235; 180/271–273, 167, 279, 283, 284, 287, 289, 730–735; 280/727–735; 123/198 B, 198 DB, 198 DC; 89/1.11

(56) References Cited

U.S. PATENT DOCUMENTS

| | | | |
|---|---|---|---|
| 1,997,064 A | 4/1935 | Lusignan | 171/27 |
| 2,524,240 A | 10/1950 | Titterton et al. | 250/98 |
| 2,534,758 A | 12/1950 | Titterton | 250/98 |
| 2,578,263 A | 12/1951 | Perkins | 171/97 |
| 2,721,265 A | 10/1955 | Rothman et al. | 250/36 |
| 3,112,004 A | 11/1963 | Neaville | 180/82 |
| 3,609,678 A | * 9/1971 | Fayling | 180/167 |
| 3,746,881 A | 7/1973 | Fitch et al. | 307/110 |
| 3,845,322 A | 10/1974 | Aslin | 307/108 |
| 4,619,231 A | 10/1986 | Stolar et al. | 123/333 |
| 4,660,528 A | * 4/1987 | Buck | 123/333 |
| 4,691,264 A | 9/1987 | Schaffhauser et al. | 361/232 |
| 4,846,044 A | 7/1989 | Lahr | 89/1.11 |
| 4,849,735 A | 7/1989 | Kirtley et al. | 340/539 |
| 4,949,216 A | * 8/1990 | Djukastein | 361/232 |
| 4,996,495 A | 2/1991 | Birx | 328/65 |
| 5,103,366 A | 4/1992 | Battochi | 361/232 |
| 5,293,527 A | 3/1994 | Sutton et al. | 340/825 |
| 5,415,246 A | * 5/1995 | Cooper | 180/287 |

* cited by examiner

*Primary Examiner*—Charles T. Jordan
(74) *Attorney, Agent, or Firm*—Fitch, Even, Tabin & Flannery

(57) ABSTRACT

An electronic vehicle disabler system and method uses a current supply capable of delivering an electrical current to a fleeing or moving vehicle that inhibits self-propelled movement of the vehicle. The electrical current is delivered by establishing a momentary forward current path between the vehicle and the current supply, at the same time that a return current path between the vehicle and current supply is established. The forward and reverse current paths may, e.g., include electrically conductive wires or electrically conductive streams of fluid or gas. The forward and reverse current paths are electrically coupleable to the fleeing vehicle through a variety of direct conductive linkages that are temporarily or permanently laid down on a roadway over which the fleeing vehicle passes, or that are coupled to the fleeing vehicle from a pursuing vehicle.

22 Claims, 4 Drawing Sheets

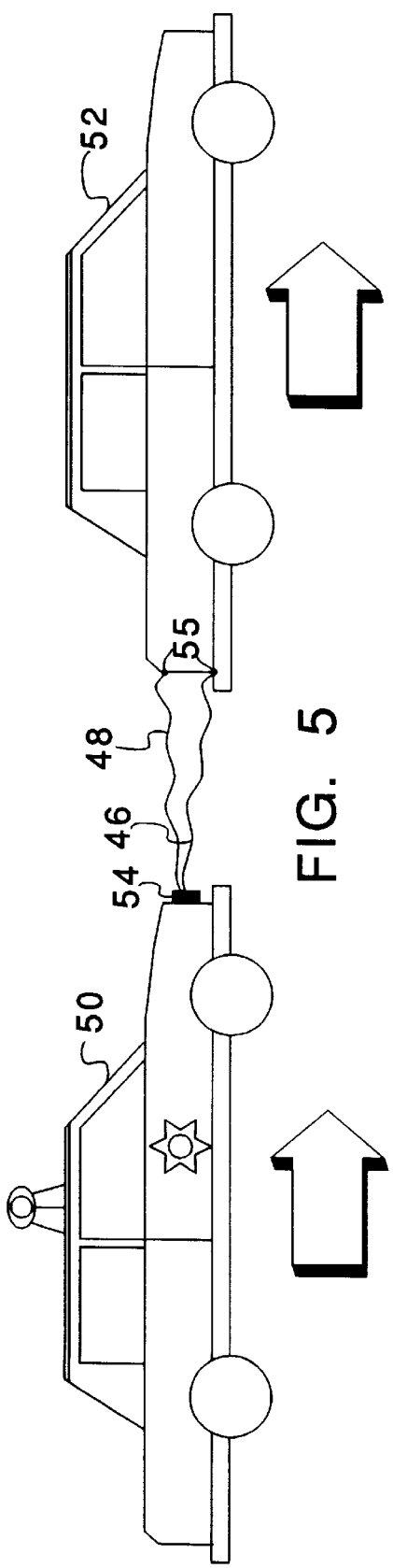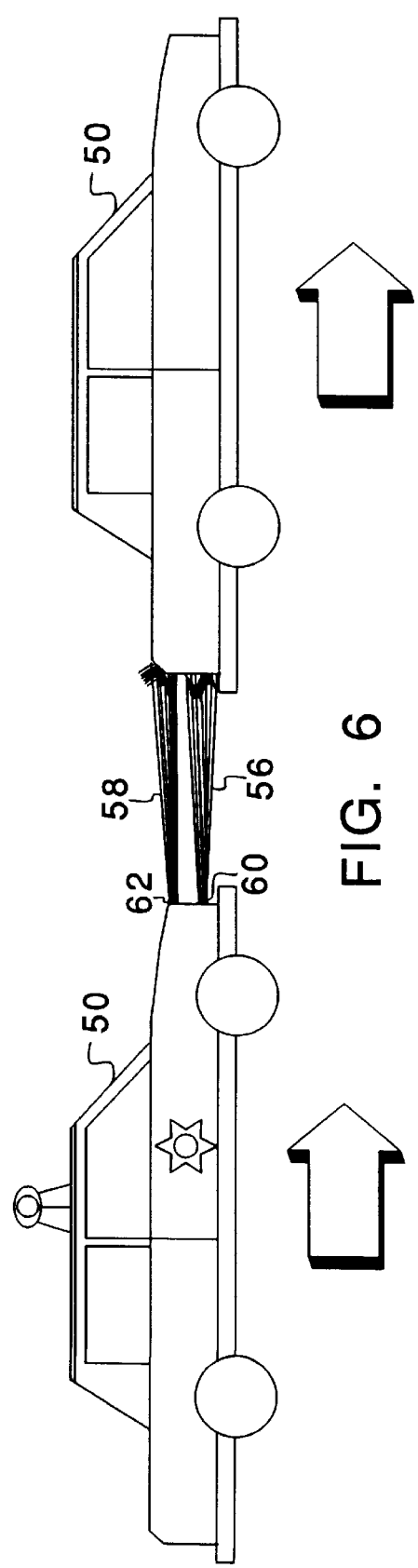

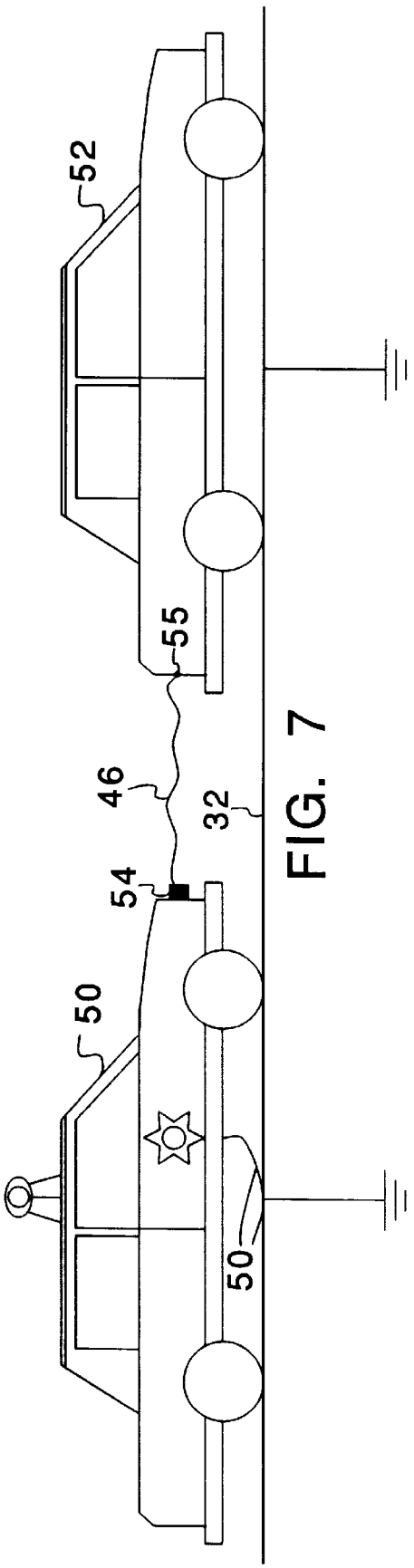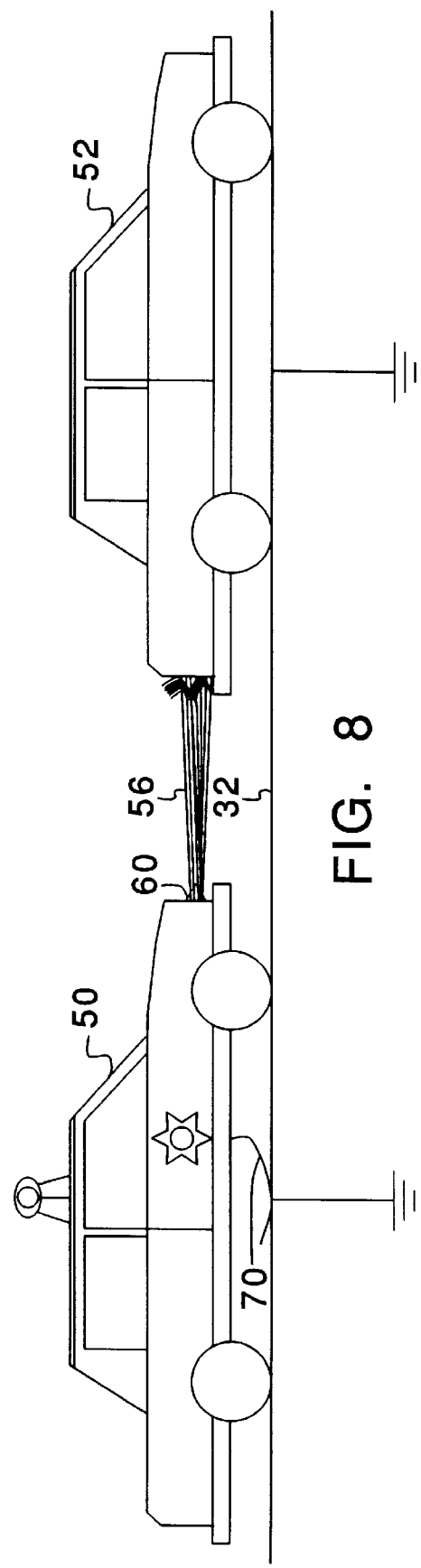

ELECTROMAGNETIC VEHICLE DISABLER SYSTEM AND METHOD

BACKGROUND OF THE INVENTION

The present invention relates to the stopping of vehicles, and more particularly to such stopping using electromagnetic energy. Even more particularly, the present invention relates to the stopping of self-propelled vehicles using high-current pulses of electromagnetic energy coupled to the vehicle through a direct contact.

Heretofore, law enforcement officers, and others with a legitimate need to stop, or arrest, vehicles, had very few choices. Roadblocks and checkpoints employing barricades made of heavy wood, concrete or police mobile units, i.e., police vehicles, are commonly used, but are of limited effectiveness due to high staffing requirements, and the ability of the vehicle that is to be stopped to "run" the roadblock by speeding through the barricades. Such roadblocks typically require the services of several police officers, and in the event the vehicle "runs" the roadblock, often requires that such officers engage in a high-speed chase.

High-speed chases used to arrest vehicles that have "run" a roadblock, or to apprehend other fleeing vehicles, are very dangerous for the officer, for bystanders, and for the vehicle's occupants. As a result, most police departments require their officers to "break off" high-speed pursuit whenever the lives of police officers, bystanders, or occupant's of the fleeing vehicle are in danger. As a result, a significant number of vehicles evade stops by police officers.

Another situation that results in high-speed pursuit is when vehicles "run" toll booths, such as are common at the entrances to tollways or tollbridges, or border checkpoints or inspection points. For example, various states and the United States government have checkpoints and/or inspection points at their borders. In the event a vehicle "runs" the checkpoint, border agents, e.g., Border Patrol Officers, are forced to either pursue such vehicles or to permit them to enter illegally. On several occasions, high-speed pursuit by United States Border Patrol Officers has resulted in death or serious injury to the officers, bystanders or fleeing vehicle occupants.

One attempt to solve this problem is through the use of spike bars that can be activated, i.e., advanced or protruded into the roadway, so that small controlled leaks are inflicted in the vehicle's tires. Soon after the leaks are inflicted, the vehicle's motion is impeded and high speeds are no longer possible. The spike bars are retracted by the pursuing officer so that his or her mobile unit, as well as other vehicles, can pass over the spike bar without damage being inflicted to the mobile unit's or other vehicle's tires. Unfortunately, spike bars are only useful in permanently installed locations, and cannot be incorporated into a discrete portable unit, or mounted in the pursing mobile unit.

Another attempt to solve the above problem is through the use of microwave radiation that disables or inhibits electronic components, such as electronic control modules for controlling electronic fuel injectors, or distributors, and the like. To applicants' knowledge, microwave radiation has never been commercially exploited for several reasons. One reason is that the microwave energy cannot be directed against a single vehicle. Thus, when a microwave radiation device is employed, all or many of the vehicles in the vicinity of the fleeing vehicle may also be temporarily or permanently disabled. The disabling of such a group of vehicles creates a particularly acute problem in busy traffic areas, where a single disabled vehicle could be pulled safely to the side of the road, but a large number of such vehicles cannot all be safely moved aside.

A further attempt to address the problem includes the installation of vehicle disabling equipment in all commercially available vehicles. The vehicle's disabling equipment normally remains off, but when activated by a law enforcement officer disables one or more key systems within the vehicle, e.g., the fuel pump or ignition system. Problematically, however, such vehicle disabling systems require that each vehicle be equipped with the disabling equipment, adding additional cost to each vehicle sold. Furthermore, because the equipment is under the control of the vehicle's owner, such equipment could easily be tampered with and possibly disabled by the vehicle's owner.

Thus, a significant need exists for an improved solution to the problem of arresting a vehicle. The present invention advantageously addresses the above and other needs.

SUMMARY OF THE INVENTION

The present invention advantageously addresses the needs above as well as other needs by providing a system and method for stopping self-propelled vehicles using high-current pulses of electromagnetic energy that are coupled directly into the vehicle to be stopped from a suitable current source.

The invention may be characterized as an electronic vehicle disabler system for inhibiting self-propelled movement of a vehicle. The system includes a current supply capable of delivering a current that inhibits self-propelled movement of the vehicle; a forward current path coupled to the current supply, and a return current path coupled to the current supply. The forward and reverse current paths may, e.g., include electrically conductive wires or electrically conductive streams of fluid or gas. The forward and reverse current paths are electrically coupleable to the vehicle. The forward current path delivers the current from the current supply to the vehicle whenever the return current path is electrically coupled to the vehicle, and the return current path returns the current to the current supply from the vehicle whenever the forward current path and the return current path are electrically coupled to the vehicle. As a result, whenever the forward current path and the return current path are electrically coupled to the vehicle a sufficiently large current flows through the vehicle so as to hinder or disable its electronic/electrical systems, thereby inhibiting vehicle movement.

The present invention may also be characterized as a method for inhibiting self-propelled vehicle movement including: (a) contacting the vehicle electrically with a first current path; (b) contacting the vehicle electrically with a second current path; (c) generating a current that is capable of inhibiting self-propelled movement of the vehicle; and (d) delivering the current through the first and second current paths so as to inhibit the self-propelled movement of the vehicle It is a feature of the invention to disable or inhibit self-propelled movement of a vehicle.

It is another feature of the invention, in one embodiment, to achieve such disabling or inhibiting using a portable electromagnetic vehicle disabler system.

It is a further feature of the invention, in another embodiment, to achieve such disabling or inhibiting using an electromagnetic vehicle disabler system that is carried by a mobile unit, i.e., a pursing vehicle.

It is an additional feature of the invention, in a further embodiment, to achieve such disabling or inhibiting by contacting the vehicle with one or more electrically conductive streams of fluid or gas.

BRIEF DESCRIPTION OF THE DRAWINGS

The above and other aspects, features and advantages of the present invention will be more apparent from the following more particular description thereof, presented in conjunction with the following drawings wherein:

FIG. 5 is a side view of a further embodiment of the system shown in FIG. 1 and shows a vehicle-mounted electromagnetic vehicle disabler system having a pair of electrically conductive wires that are deployed from a pursuing vehicle against a pursued vehicle so as to put the pursued vehicle into electrical communication with the wires;

FIG. 6 is a side view of a variation of the embodiment shown in FIG. 5, and shows a vehicle-mounted lectromagnetic vehicle disabler system having a pair of electrically conductive fluid streams that are discharged from a pursuing vehicle against a pursued vehicle so as to put the pursued vehicle into electrical communication with the fluid streams;

FIG. 7 is a side view of an additional embodiment of the system shown in FIG. 1 and shows a vehicle-mounted electromagnetic vehicle disabler system having a single electrically conductive wire that is deployed from a pursuing vehicle against a pursued vehicle so as to put the pursued vehicle into electrical communication with the wire;

FIG. 8 is a side view of a variation of the additional embodiment shown in FIG. 7, showing a vehicle-mounted electromagnetic vehicle disabler system having a single electrically conductive fluid stream that is discharged from a pursuing vehicle against a pursued vehicle so as to put the pursued vehicle into electrical communication with the fluid stream.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Figure 1:
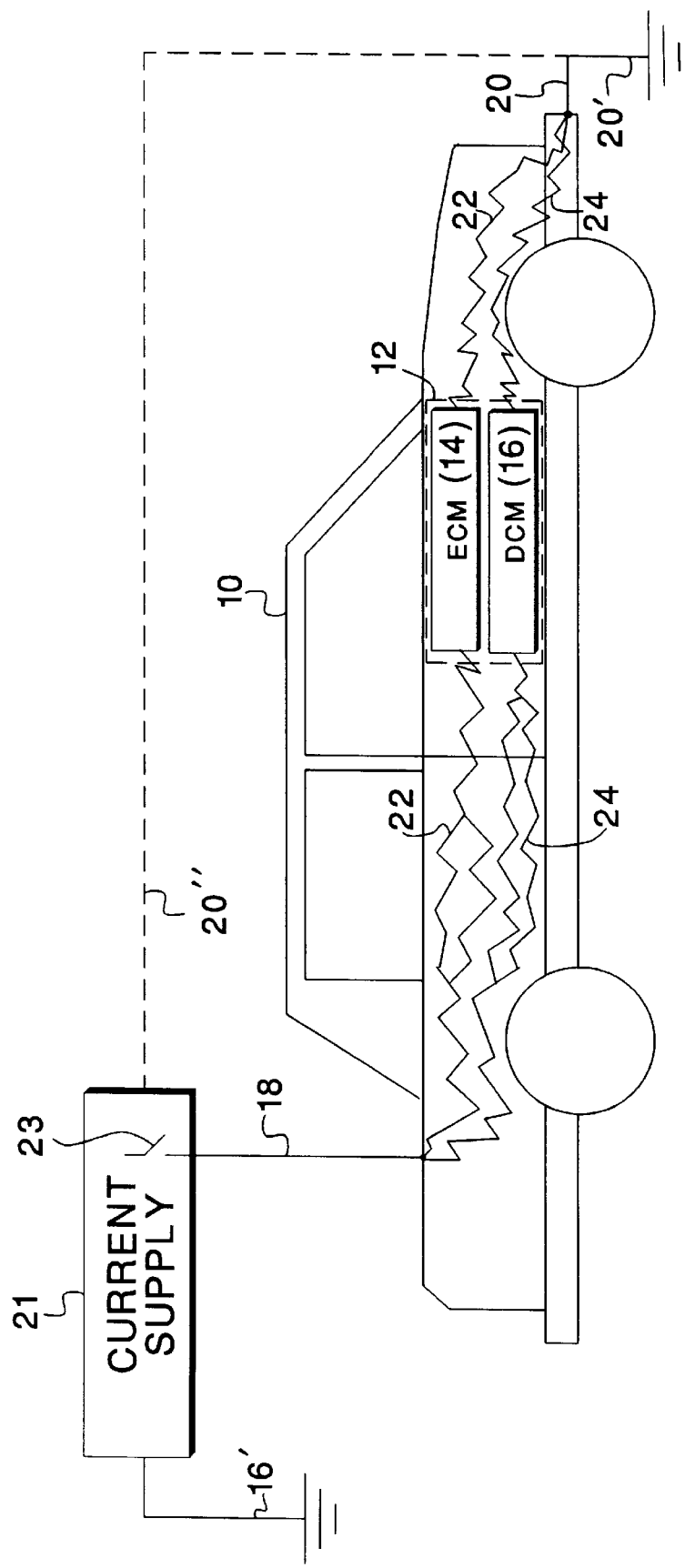
FIG. 1 is a schematic view of a vehicle coupled to an electromagnetic vehicle disabler made in accordance with the present invention.

Referring first to FIG. 1, a schematic view is shown of a vehicle 10 coupled to an electromagnetic vehicle disabler made in accordance with the present invention. The vehicle 10 can be any type of self-propelled mobile personal property. For example, the vehicle may be a car, a motorcycle, a truck, a bus, etc. The vehicle 10 is powered by an internal combustion engine 12, however any source of mechanical power that relies on electrical signals, such as an electronic fuel injection system or an electronic ignition, may be subject to the disabler features of the present invention. As shown, the internal combustion engine 12 includes an electronic control module (ECM) 14, and a distributor control module (DCM) 16, such as are known in the art.

The present invention arrests the vehicle 10 by coupling it to a first current path 18 and to a second current path 20. The second current path 20, which serves as a return current path, can include earth ground 20', or can include an alternative return current path 20", such as an electrically conductive wire, or electrically conductive fluid or gas stream. The first current path 18, or forward current path, can also include an electrically conductive wire, or electrically conductive fluid or gas stream. The first (forward) and second (return) current paths 14, 16 are coupled to a current supply 21. The current supply 21 generates an electrical current that passes through the forward current path 14, to the vehicle 10, and to the return current path 16. A switch 23 within or coupled to the supply 21 allows the current to be supplied or not supplied as desired. In the event either of the forward or return current paths 14, 16 are decoupled from the vehicle 10, the current ceases flowing through the current paths 14, 16. However, in the event both the forward and return current paths 14, 16 are coupled to the vehicle 10, as is shown in FIG. 1, portions of the current pass through electrically conductive components throughout the vehicle 10. For example, portions of the current pass through a metallic body, frame, and wiring of the vehicle 10. Specifically, portions 22, 24 of the current pass through the electronic control module 14 and/or the distributor control module 16 via, e.g., the wiring of the vehicle 10.

The electronic control module 14 and/or the distributor control module 16 are highly sensitive electronic components commonly found in internal combustion engines of modern automobiles and other vehicles. The electronic control module 14 controls an electronic fuel injection system within the internal combustion engine 12, and the distributor control module 16 controls an electronic ignition system within the internal combustion engine 12. As one of the portions 22 of the current passes through the electronic control module 14, it partially or fully disables the electronic control module 14, which causes the internal combustion engine 12 to run poorly, i.e., roughly, and to not be able to run or operate at high speeds, or alternatively, to not run at all. Similarly, as another of the portions 24 of the current passes through the distributor control module 16, it partially or fully disables the distributor control module 16, which causes the internal combustion engine to operate poorly, or not run at all. In this way, the vehicle 10 is inhibited or disabled from self-propelled movement, i.e., the vehicle is arrested.

The electrical current from the current supply 21 is from 150 to 5000 amps, and is preferably 300 to 4000 amps, e.g., 3000 amps. The current can be either pulsed direct current, or alternating current, including pulsed alternating current. Alternating current is preferred in the event the return current path includes earth ground, and is particularly preferred when the return current path includes highly insulative components, such as tires of the vehicle 10, in which case alternating current is needed to facilitate electromagnetic coupling between the tires and earth ground. To achieve such coupling, the frequency of the alternating current is between 1 MHz and 500 MHz, and is preferably between 10 MHz and 25 MHz.

The current supply 21 stores about 1 milli Coulomb (mC) of charge, and 100 Joules (J) of energy. The inductance of the charge supply is about 1 μH, and the voltage at which the current is delivered is small enough so that it does not break down along the surface of the vehicle 10 and cause undesirable arcing. The voltage delivered is between 1 kV and 50 kV, preferably 10–15 kV. The current supply 21 includes a capacitive charge source, an electrolytic (i.e., not reversible) capacitive charge source, a shock initiated charge source and/or a superconductive charge source.

Figure 2:
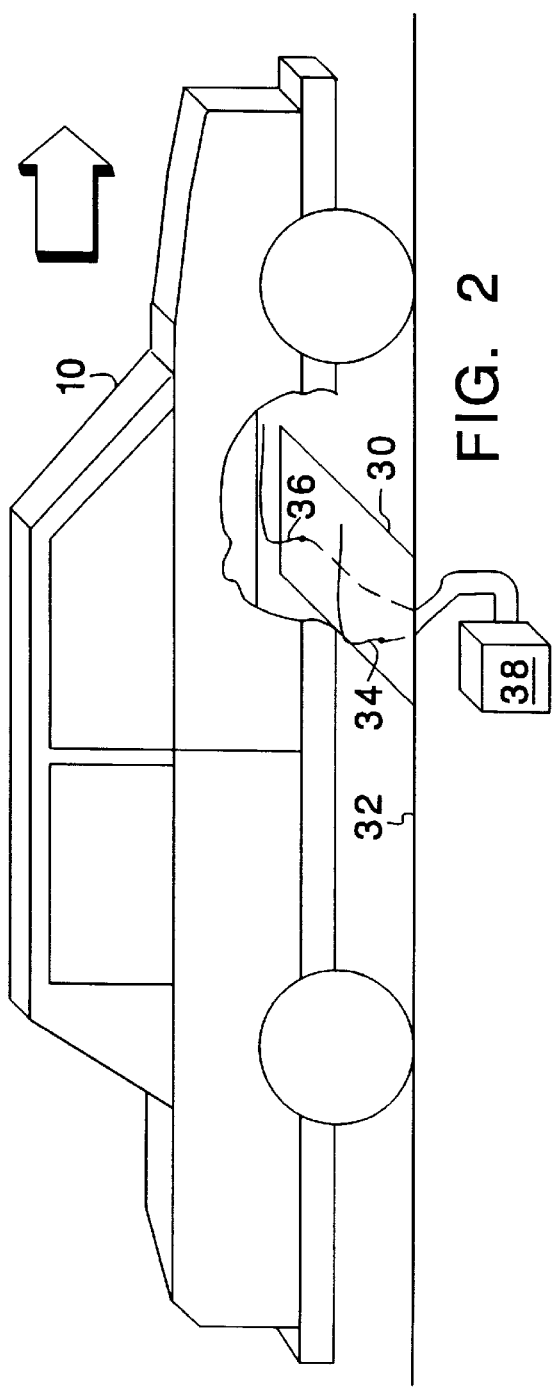
FIG. 2 is a perspective partial cut-away view of a vehicle in electrical communication with a man-portable electromagnetic vehicle disabler system made in accordance with one embodiment of the system shown in FIG. 1.

Referring next to FIG. 2, a perspective partial cut-away view is shown of the vehicle 10 in electrical communication with a man-portable electromagnetic vehicle disabler system. The vehicle 10 is shown passing over a flat mounting plate 30 to which two protruding electrodes or wires are affixed. The mounting plate 30 may also be referred to as a driving surface 30. The driving surface 30 is placed on top of a road surface 32. Projecting from the driving surface 30 are a first electrically conductive wire 34 and a second electrically conductive wire 36. The electrically conductive wires 34, 36 serve as the forward and reverse current paths 18, 20 of FIG. 1, respectively, and are connected to a current supply unit 38, which serves as the current supply 21 of FIG. 1.

The current supply unit 38 is preferably battery powered or powered from a portable energy source (such as a police van), and, together with the driving surface 30, is preferably portable. The dimensions of the driving surface are about 8 to 10 ft. ×1 ft. ×1 in.

In use, the current passes from the current supply unit 38 to the first electrically conductive wire 34, through the vehicle 10 (and components therein, such as the electronic control module and distributor control module of FIG. 1) to the second electrically conductive wire 36. While much of the electrical current that is injected into the vehicle by the present invention simply flows from one ground point to another, the magnitude of the ground current that thus flows is sufficiently large so as to induce other currents to flow in the electrical circuits, e.g., the DCM 16 and/or the ECOM 14, of the vehicle so as to disable and/or bum out such electrical circuits.

The electrically conductive wires 34, 36 protrude up from the surface 30 and assume a substantially normal position relative to the driving surface 30 when the vehicle 10 is not passing over the driving surface 30. The electrically conductive wires preferably protrude from the driving surface at least 10 inches, and no more than about 18 inches. When the vehicle 10 is passing over the driving surface 30, the electrically conductive wires 34, 36 bend over, as shown in FIG. 2, and mechanically and electrically engage the underside (or undercarriage) of the vehicle 10. When the electrically conductive wires 34, 36 are in the substantially normal position, i.e., when the vehicle 10 is not passing over them, they are open circuited, i.e., the current does not flow between them. When they electrically engage the vehicle 10, the vehicle electrically couples the electrically conductive wires 34, 36 to each other, allowing the current to flow from the first electrically conductive wire 34 through the vehicle 10 to the second electrically conductive wire 36. Thus, there is no need for a switching device in the current supply unit to activate the vehicle disabler system. A switching device is used, however, to deactivate the vehicle disabler system so that vehicles that are not to be disabler can pass over the driving surface 30 without having the current pass through them, i.e., without being disabler.

Figure 3:
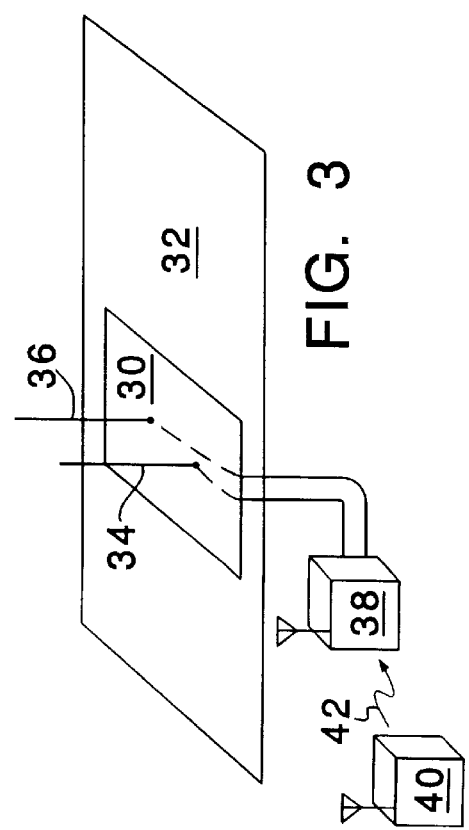
FIG. 3 is a perspective view of the man-portable electromagnetic vehicle disabler system shown in FIG. 2.

Referring next to FIG. 3, a perspective view is shown of the man-portable electromagnetic vehicle disabler system. The driving surface 30 is shown on top of the road surface 32. The electrically conductive wires 34, 36 project from the driving surface 30 in a substantially normal direction, and the current source unit 38 is coupled to the electrically conductive wires 34, 36.

Figure 4:
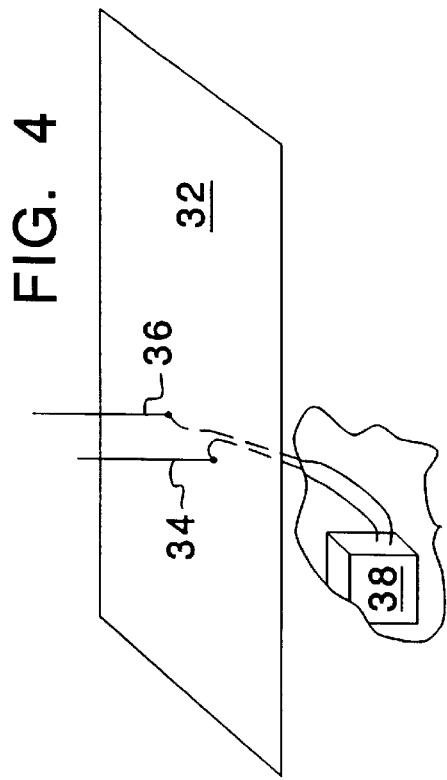
FIG. 4 is a perspective view of a permanently-installed electromagnetic vehicle disabler system made in accordance with another embodiment of the system shown in FIG. 1.

Referring next to FIG. 4, a perspective view is shown of a permanently-installed electromagnetic vehicle disabler system. The road surface is shown 32, but the driving surface 30 (of FIG. 3) is not shown, because in the permanently-installed electromagnetic vehicle disabler system, the road surface 32 serves to mechanically support the first and second electrically conductive wires 34, 36. Except as denoted below, the permanently-installed electromagnetic vehicle disabler system is similar to the man-portable electromagnetic vehicle disabler system described herein. The current supply unit 38 used with the permanently-installed electromagnetic vehicle disabler system of FIG. 4 may be permanently installed underground, and can utilize alternating current power-lines as a power source (The man-portable disabler system of FIG. 3 may also be plugged into such an A.C. power source line if a suitable outlet is nearby). Such underground placement serves to prevent theft and vandalism of the charge supply unit 38 (but eliminates the portability of the charge supply unit 38). The charge supply unit of the permanently-installed vehicle disabler system, has a switching device with which it can be deactivated so as to prevent delivery of he current to vehicles that pass over the road surface (i.e., driving surface) that are not to be disabler.

The use of alternating current power lines, as are commonly known in the art, e.g., 220/110 volt alternating current lines, eliminates the need to provide for replacement or recharging of the battery that may be used with the man-portable electromagnetic vehicle disabler system. The permanently-installed electromagnetic vehicle disabler system can, however, utilize such a battery as a backup power source, e.g., in the event the power supplied by the alternating current land lines is interrupted.

The permanently-installed electromagnetic vehicle disabler system may be used in environments where such a permanent installation is desirable. For example, the permanently-installed electromagnetic vehicle disabler may be installed at toll gates, or border crossings, where in the event the vehicle 10 attempts to "run" the toll gate or border gate, the vehicle 10 can be arrested (stopped) by an officer activating the switching device of the electromagnetic vehicle disabler system.

In contrast, the man-portable electromagnetic vehicle disabler of FIGS. 2 and 3 is desirable in environments where vehicle disabler is not normally needed, such as might be the case if a temporary police check point or road block were established.

In the event the man-portable electromagnetic vehicle disabler system is used to arrest vehicles, in lieu of conventional police roadblocks using wooden barricades, police mobile units, or the like, a remote transmitter 40 may be used to transmit a trigger signal 42, which toggles the switching device 23 within the charge supply unit 30 on or off. In this way, a police officer can manually toggle the man-portable electromagnetic vehicle disabler system on or off so that only vehicles that are to be disabler will be subjected to the current—when the current supply unit 38 is toggled on—whereas vehicles that, for example, the police officer wants to let pass the electromagnetic vehicle disabler will not be subjected to the current—when the current supply unit 38 is toggled off. In a simplified embodiment, the switching device of the current supply unit 38 is a conventional SPST power toggle switch, that can be switched on or off by a user, e.g., the police officer.

Referring next to FIG. 5, a side view is shown of a vehicle-mounted electromagnetic vehicle disabler system having a pair of electrically conductive wires 46, 48 that are deployed from a pursuing vehicle 50 (or mobile unit) against a pursued vehicle 52 (i.e., the vehicle 10 of FIG. 1) so as to put the pursued vehicle 52 in electrical communication with the electrically conductive wires 46, 48.

The electrically conductive wires 46, 48 are deployed against the pursued vehicle 52 from a launcher 54, which may utilize pressurized air, chemical explosive force, e.g., gunpowder, spring force, or the like to propel the electrically conductive wires 46, 48 against the pursued vehicle 52. The electrically conductive wires 46, 48 remain affixed, at a proximal end of the electrically conductive wires 46, 48, to respective points near the launcher 45. The points are electrically coupled to the current supply unit 38, which is housed within the pursing vehicle's engine compartment (not shown in FIG. 5). Distal ends of the electrically conductive wires 46, 48 are fitted with fasteners 55, such as suction cups, magnets, or other highly adhesive devices or materials that readily adhere to the surface, e.g., the rear decklid and/or bumper, of the pursued vehicle 52. The fasteners 55 also serve to weight the distal ends of the electrically conductive wires 46, 48 so as to facilitate their propulsion toward the pursued vehicle.

Thus, when the electrically conductive wires 46, 48 are propelled by the launcher 54 against the pursued vehicle 52, the fasteners 55 at the distal ends thereof are propelled toward the pursed vehicle and mechanically adhere to part of, e.g., the rear decklid of, the pursued vehicle 52. Such mechanical adherence causes an electrical connection between the electrically conductive wires 46, 48 and the pursued vehicle 52, and allows the current (from the current supply unit) to flow from one of the electrically conductive wires 46, through the pursued vehicle 52, to another of the electrically conductive wires 48. Such current causes the disabling or inhibiting of the pursued vehicle's power source, as described hereinabove. In this way, the pursued vehicle 52 is disabler by the pursuing vehicle 50.

Referring next to FIG. 6, a side view is shown of a vehicle-mounted electromagnetic vehicle disabler system having a pair of electrically conductive fluid streams 60, 62 that are discharged from a pursuing vehicle 50 against a pursued vehicle 52 so as to put the pursued vehicle 52 in electrical communication with the electrically conductive fluid streams 60, 62.

The electrically conductive fluid streams 46, 48 are discharged against the pursued vehicle 52 from first and second nozzles 60, 62, which may utilize pressurized air or the like to propel the electrically conductive fluid streams 56, 58 against the pursued vehicle 52. The electrically conductive fluid streams 56, 58 are discharged through the nozzles 60, 62 from reservoirs (not shown) within the pursuing vehicle 50. The reservoirs are in electrical communication with the current supply unit 38 (not shown in FIG. 6) and supply the current to the electrically conductive fluid streams 56, 58.

Thus, when the electrically conductive fluid streams 56, 58 are discharged by the nozzles 60, 62 against the pursued vehicle 52, and an electrical connection is made between the electrically conductive fluid streams 56, 58 and the pursued vehicle 52, such connection allows the current (from the current supply unit 38) to flow from one of the electrically conductive fluid streams 56, through the pursued vehicle 52, to another of the electrically conductive fluid streams 58. As a result, the power source of the pursued vehicle is disabled or inhibited as described hereinabove, thereby disabler the pursued vehicle.

Alternatively, the electrically conductive fluid streams 56 may project from a driving surface, instead of from the pursuing vehicle 50, so as to be in electrical communication with the pursued vehicle 52 when the pursued vehicle 52 drives over the driving surface.

Referring next to FIG. 7, a side view is shown of a vehicle-mounted electromagnetic vehicle disabler system having a single electrically conductive wire 46 that is deployed from the pursuing vehicle 50 against the pursued vehicle 52 so as to put the pursued vehicle 42 in electrical communication with the electrically conductive wire 46.

The single electrically conductive wire 46 is deployed against the pursued vehicle 52 from the launcher 54, as described hereinabove. The electrically conductive wire 46 remains affixed, at a proximal end of the electrically conductive wire 46, to a point near the launcher 45. The point is coupled to the current supply unit 38 (not shown in FIG. 5). As described above, a distal end of the electrically conductive wire 46 is fitted with a fastener 55 of the pursued vehicle 52.

When the electrically conductive wire 46 and the fastener 55 are propelled by the launcher 54 against the pursued vehicle 52, the fastener 55 at the distal end thereof mechanically adheres to the pursued vehicle 52. Such mechanical adherence causes the electrical connection between the electrically conductive wire 46 and the pursued vehicle 52, and allows a high frequency alternating current (from the current supply unit 38) to flow from the electrically conductive wire 46, through the pursued vehicle 52, to earth ground. Such flow to earth ground may be through the pursued vehicle's tires, with coupling between the pursued vehicle and earth ground being facilitated by the high frequency of the alternating current.

The charge supply unit 38 within the pursing vehicle 50 is coupled to earth ground using a grounding wire 70 that drags along the road surface 32, thereby placing the pursing vehicle 50 into electrical communication with the road surface 32, i.e. earth ground. The grounding wire 70 is affixed to the underside of the pursing vehicle at a substantially normal angle relative thereto, but is not grounded to, i.e., electrically connected to, the underside of the pursing vehicle 50. Instead an insulated grounding cable (not shown within the pursuing vehicle 50) passes return current from the grounding wire 70 to the current supply unit 38. The grounding wire 70 bends so as to contact the road surface 32 substantially parallel thereto. Mechanical contact between the grounding wire 70 and the road surface 32, i.e., earth ground, is facilitated by spring force, which arises due to the bending of the grounding wire 70.

When the current is passed through the electrically conductive wire 46 to the pursed vehicle 52, and back through earth ground to the current supply unit 38, the power source of the pursed vehicle is disabled or inhibited, thereby disabler the pursued vehicle.

Referring next to FIG. 8, a side view is shown of a vehicle-mounted electromagnetic vehicle disabler system having a single electrically conductive fluid stream 56 that is discharged from a pursuing vehicle 50 against a pursued vehicle 52 so as to put the pursued vehicle 52 in electrical communication with the electrically conductive fluid stream 56.

The single electrically conductive fluid stream 56 is deployed against the pursued vehicle 52 from the nozzle 60, described hereinabove. The electrically conductive fluid stream 56 is discharged through the nozzle 60 from the reservoir (not shown) within the pursuing vehicle 50 and the reservoir is in electrical communication with the current supply unit 38 (not shown in FIG. 6).

When the electrically conductive fluid stream 46 is discharged by the nozzle 60 against the pursued vehicle 52, an electrical connection is made between the electrically conductive fluid stream 46 and the pursued vehicle 52, which allows a high frequency alternating current (from the current supply unit 38) to flow from the electrically conductive fluid stream 46, through the pursued vehicle 52, to earth ground. Such flow is facilitated by the high frequency of the current, because such high frequency facilitates the coupling of the current through, e.g., the pursued vehicle's tires, as described hereinabove.

The charge supply unit 38 within the pursing vehicle 50 is coupled to earth ground using the grounding wire 70 that drags along the road surface 32, thereby placing the pursing vehicle 50 into electrical communication with the road surface 32, i.e. earth ground. In this way, the pursued vehicle 52 is disabler by the pursuing vehicle 50.

The use of electrically conductive fluid streams to establish electrical communication is described in copending patent application Ser. No. 08/273,571, filed concurrently herewith, entitled Portable Electronic Stun Device and Method, which application is assigned to the same assignee as the present application and is incorporated herein by reference.

While the invention herein disclosed has been described by means of specific embodiments and applications thereof, numerous modifications and variations could be made thereto by those skilled in the art without departing from the scope of the invention set forth in the claims.

What is claimed is:

1. An electronic vehicle disabling system for inhibiting self-propelled movement of a vehicle, the system including:
   a current supply capable of delivering a current that inhibits self-propelled movement of the vehicle;
   a forward current path coupled to the current supply; and
   a return current coupled to the current supply, the forward current path delivering the current from the current supply to the vehicle in the event the forward current path and the return current path are electrically coupled to the vehicle, and the return current path returning the current to the current supply from the vehicle in the event the forward current path and the return current path are electrically coupled to the vehicle;
   whereby vehicle movement is inhibited in the event the forward current path and the return current path are electrically coupled to the vehicle.

2. The system of claim 1 including:
   a switching device coupled to said current supply, the switching device having a first state in which said current is delivered through said forward current path to said vehicle in the event said forward current path is electrically coupled to said vehicle, and a second state in which said current is not delivered through said forward current path to said vehicle;
   whereby vehicle movement is inhibited in the event said forward current path and said return current path are electrically coupled to said vehicle, and in the event the switching device is in the first state.

3. The system of claim 1 wherein said current supply is capable of delivering said current that inhibits self-propelled movement of said vehicle, wherein said current inhibits electrical components within the vehicle.

4. The system of claim 1 wherein said forward current path includes a first electrically conductive wire.

5. The system of claim 4 wherein said first electrically conductive wire projects from a driving surface so as to be in electrical communication with said vehicle when said vehicle drives over the driving surface.

6. The system of claim 5 wherein said return current path includes a second electrically conductive wire, said second electrically conductive wire projecting from said driving surface so as to be in electrical communication with said vehicle when said vehicle passes over said driving surface.

7. The system of claim 6 wherein said driving surface is a portable surface that can be rested on top of a fixed road surface.

8. The system of claim 7 wherein said driving surface is a fixed road surface.

9. The system of claim 4 including:
   a launcher that discharges said first electrically conductive wire against said vehicle, said first electrically conductive wire being capable of coming into electrical communication with said vehicle when projected thereagainst.

10. The system of claim 9 wherein said return current path includes a second electrically conductive wire, said laucher discharging the second electrically conductive wire against said vehicle, the second electrically conductive wire being capable of coming into electrical communication with said vehicle when discharged thereagainst.

11. The system of claim 9 including:
    a self-propelled mobile unit mechanically coupled to said launcher, the self-propelled mobile unit being capable of moving said launcher to within a prescribed range of said vehicle before said launcher discharges said first electrically conductive wire against said vehicle.

12. The system of claim 1 wherein said forward current path includes a first electrically conductive fluid stream.

13. The system of claim 12 including:
    a first nozzle that discharges said first electrically conductive fluid stream against said vehicle, said first electrically conductive fluid stream being capable of coming into electrical communication with said vehicle when discharged thereagainst.

14. The system of claim 13 wherein said return current path includes a second electrically conductive fluid stream, said system including:
    a second nozzle that discharges the second electrically conductive fluid stream against said vehicle, the second electrically conductive fluid stream being capable of coming into electrical communication with said vehicle when discharged thereagainst.

15. The system of claim 13 including:
    a self-propelled mobile unit mechanically coupled to said first nozzle, the self-propelled mobile unit being capable of moving said first nozzle to within a prescribed range of said vehicle before said first nozzle discharges said first electrically conductive fluid stream against said vehicle.

16. A method for inhibiting self-propelled vehicle movement including:
    contacting the vehicle electrically with a first current path;
    contacting the vehicle electrically with a second current path;
    generating a current that is capable of inhibiting self-propelled movement of the vehicle;

delivering the current through the first and second current paths so as to inhibit the self-propelled movement of the vehicle;

whereby self-propelled vehicle movement is inhibited.

17. The method of claim 16, wherein said contacting said vehicle electrically with said first current path includes:

contacting said vehicle electrically with a first electrically conductive wire.

18. The method of claim 17 wherein said contacting said vehicle electrically with said second current path includes:

contacting said vehicle electrically with a second electrically conductive wire.

19. The method of claim 17 wherein said contacting said vehicle electrically with a first electrically conductive wire includes:

positioning said electrically conductive wire so as to project from a driving surface so that, in the event said vehicle passes over the driving surface, the electrically conductive wire comes into electrical communication with said vehicle.

20. The method of claim 16 wherein said contacting said vehicle electrically with said first current path includes:

contacting said vehicle electrically with a first electrically conductive fluid stream.

21. A method for inhibiting self-propelled vehicle movement including:

a first current path;

means for contacting the vehicle electrically with the first current path;

a second current path;

means for contacting the vehicle electrically with the second current path;

means for generating a current that is capable of inhibiting self-propelled movement of the vehicle;

means for delivering the current through the first and second current paths so as to inhibit the self-propelled movement of the vehicle;

whereby self-propelled vehicle movement is inhibited.

22. A method for disabling a first vehicle, comprising:

administering a discharge to an undercarriage of the first vehicle;

overloading at least one electronic engine control of the vehicle; and causing failure of the at least one electronic engine control of the first vehicle.

* * * * *

UNITED STATES PATENT AND TRADEMARK OFFICE
CERTIFICATE OF CORRECTION

PATENT NO.    : 6,371,000 B1
DATED         : April 16, 2002
INVENTOR(S)   : Hutmacher et al.

It is certified that error appears in the above-identified patent and that said Letters Patent is hereby corrected as shown below:

Column 9,
Line 42, before "coupled" insert -- path --

Signed and Sealed this

Twenty-third Day of July, 2002

Attest:

Attesting Officer

JAMES E. ROGAN
Director of the United States Patent and Trademark Office